(No Model.)

G. W. HOWELL.
WHEEL.

No. 420,343. Patented Jan. 28, 1890.

Witnesses
J. Watson Sims
C. W. Miles

Inventor
George W. Howell
By his Attorneys
Wood & Boyd

UNITED STATES PATENT OFFICE.

GEORGE WASHINGTON HOWELL, OF COVINGTON, KENTUCKY, ASSIGNOR TO THE HOWELL WHEEL COMPANY, OF SAME PLACE.

WHEEL.

SPECIFICATION forming part of Letters Patent No. 420,343, dated January 28, 1890.

Application filed October 17, 1889. Serial No. 327,350. (No model.)

*To all whom it may concern:*

Be it known that I, GEORGE WASHINGTON HOWELL, a citizen of the United States, and a resident of Covington, in the county of Kenton and State of Kentucky, have invented certain new and useful Improvements in Wheels, of which the following is a specification.

This invention has for its object to provide a novel, durable, and simple metallic wheel for vehicles and other purposes; and it consists in the features of construction and combination or arrangement of devices hereinafter described, and specifically set forth in the claims, reference being made to the accompanying drawings, in which—

Figure 1:
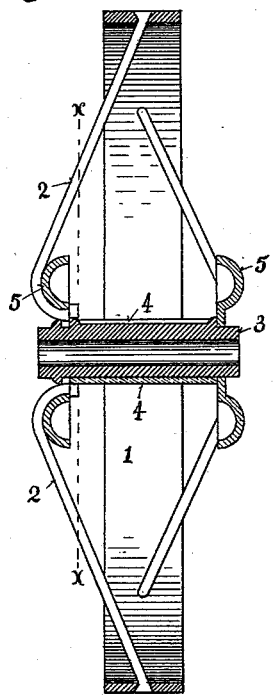
Figure 2:
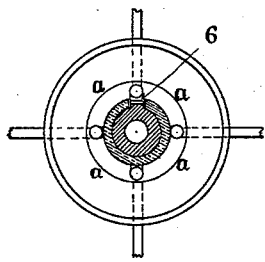
Figure 3:
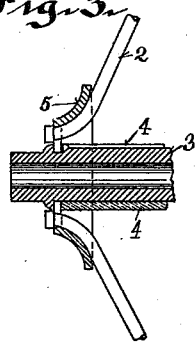
Figure 4:
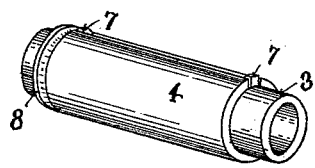

Figure 1 is a central vertical section of my improvement. Fig. 2 is a section on line $xx$, Fig. 1. Fig. 3 is a sectional view showing a modified construction. Fig. 4 is a detail view of the hub.

1 represents the rim, and 2 the spokes, of an ordinary metallic wheel.

3 represents the sleeve of the hub.

4 represents a split sleeve encircling the solid sleeve 3.

5 represents disks resting upon the sleeves and forming a part of the hub. The disks 5 are curved, so as to conform in shape and serve as an abutment for the spokes 2. They are provided with a series of slots 6, one for each spoke, which is hooked therein, the notches being sufficiently deep to have the head of the spokes rest upon the hub when it is placed in position.

In Figs. 1 and 2 the disks 5 are shown of a shape adapted to engage with the spoke which hooks through the outside. In Fig. 3 a reverse form is shown, where they hook in from the inside.

The wheel is put together as follows: The spokes are passed through the rim and hooked into the disks 5. They are then spread to receive the spilt ring 4. This being in position, it is prepared to receive any desired solid sleeve or spindle, which can be inserted now or at any future time. The solid sleeve is provided with lugs 7, which are driven into the slot of the split sleeve, as shown in Fig. 4, thereby spreading the sleeve outward and tightening the parts. One end of the sleeve is provided with an annular flange 8 or a lug which seats against the disk. On the opposite side of the disk is also a lug. This inner lug is preferably continued through to bear against the opposite disk and fill opening in thimble. As soon as the solid sleeve is driven in, it is turned until the lugs 7 abut against the disk—say at points $a$, Fig. 2—which prevents the sleeve from being taken out until it is turned so as to bring the lugs opposite the slots.

The tension of the strained wheel is sufficient to hold the parts together until pressure is applied to relieve the strain and allow the hubs to be turned. By this means the wheel is readily put together and securely held in position, and can be taken apart for the purpose of repair or shipment.

It will be observed that the lugs 7 and the split sleeve 4 hold the disks 5 apart, and thereby maintain the strain of the wheel. A wheel thus constructed can be made of malleable or steel castings and readily put together with very little labor, making at once a cheap, strong, and durable device.

Having described my invention, what I claim is—

1. The hub of a wheel composed of the solid sleeve 3, and split sleeve 4, and disks 5, to which the spokes of the wheel are secured, substantially as herein specified.

2. The hub of a wheel composed of the split sleeve 4, the solid sleeve 3, provided with lugs 7, for spreading the split sleeve and abutting against the disk to hold the wheel in the strained position, substantially as specified.

3. A wheel composed, substantially, of the hub formed of the solid sleeve 3, the split sleeve 4, and the disks 5, provided with slots into which the spokes 2 are hooked and the parts secured together by the detachable sleeve 3, having lugs 7, substantially as herein specified.

In testimony whereof I have hereunto set my hand.

GEORGE WASHINGTON HOWELL.

Witnesses:
HAYWARD D. GATCH,
T. SIMMONS.